US012565952B2

(12) United States Patent
Stoll et al.

(10) Patent No.: US 12,565,952 B2
(45) Date of Patent: Mar. 3, 2026

(54) VALVE FOR A FLUID LINE OF A VEHICLE

(71) Applicant: NORMA GERMANY GMBH, Maintal (DE)

(72) Inventors: Viktor Stoll, Maintal (DE); Gary Williams, Maintal (DE); David Peterson, Maintal (DE); Daniel Kintea, Maintal (DE)

(73) Assignee: NORMA GERMANY GMBH, Maintal (DE)

( * ) Notice: Subject to any disclaimer, the term of this patent is extended or adjusted under 35 U.S.C. 154(b) by 0 days.

(21) Appl. No.: 18/568,973

(22) PCT Filed: May 18, 2022

(86) PCT No.: PCT/EP2022/063446
§ 371 (c)(1),
(2) Date: Dec. 11, 2023

(87) PCT Pub. No.: WO2022/258331
PCT Pub. Date: Dec. 15, 2022

(65) Prior Publication Data
US 2024/0280201 A1 Aug. 22, 2024

(30) Foreign Application Priority Data

Jun. 10, 2021 (DE) ...................... 10 2021 114 973.8

(51) Int. Cl.
*F16L 29/04* (2006.01)
(52) U.S. Cl.
CPC .................................. *F16L 29/04* (2013.01)

(58) Field of Classification Search
CPC . F16L 37/32; F16L 37/35; F16L 37/36; F16L 29/04; F16L 37/34
See application file for complete search history.

(56) References Cited

U.S. PATENT DOCUMENTS

| 165,415 | A | * | 7/1875 | Henderson | ............... | F16L 37/32 |
| | | | | | | 137/614.04 |
| 2,461,705 | A | * | 2/1949 | Stranberg | .............. | F16L 37/086 |
| | | | | | | 285/305 |

(Continued)

FOREIGN PATENT DOCUMENTS

| CN | 110131510 A | * | 8/2019 | .............. F16L 29/04 |
| CN | 110131510 B | | 1/2021 | |

(Continued)

OTHER PUBLICATIONS

International Search Report for International Application No. PCT/EP2022/063446 dated Jul. 26, 2022 (5 pages).

*Primary Examiner* — David Colon-Morales
(74) *Attorney, Agent, or Firm* — REISING ETHINGTON, P.C.

(57) ABSTRACT
A valve for a fluid line of a vehicle has a fluid channel, a spring element and support element with a sealing element. The support element is movably arranged in the fluid channel, the fluid channel being configured to guide a fluid between a valve opening and a fluid line connected to the valve. The spring element is configured to push a sealing element via the support element on a valve seat to close the valve. The support element is configured to separate the fluid channel from the spring element. Furthermore, a valve coupling assembly has a first fluid line connector and a second fluid line connector. The first fluid line connector comprises the valve.

8 Claims, 2 Drawing Sheets

(56) References Cited

U.S. PATENT DOCUMENTS

| | | | | |
|---|---|---|---|---|
| 2,548,528 | A * | 4/1951 | Hansen | F16L 37/23 |
| | | | | 137/614.04 |
| RE23,365 | E * | 5/1951 | Strandberg | F16L 37/35 |
| | | | | 137/614.04 |
| 2,678,834 | A * | 5/1954 | Courtot | F16L 37/101 |
| | | | | 137/614.02 |
| 2,972,491 | A * | 2/1961 | Dutton | F16L 37/252 |
| | | | | 251/89.5 |
| 3,196,897 | A * | 7/1965 | Hodson | F16L 37/23 |
| | | | | 137/614.04 |
| 3,217,746 | A * | 11/1965 | Voisine | F16L 37/107 |
| | | | | 285/361 |
| 3,380,476 | A * | 4/1968 | Torres | F16L 37/002 |
| | | | | 102/373 |
| 3,570,543 | A * | 3/1971 | Ekman | F16L 37/32 |
| | | | | 137/614.04 |
| 3,613,726 | A * | 10/1971 | Torres | F16L 37/23 |
| | | | | 285/86 |
| 4,200,121 | A * | 4/1980 | Walter | F16L 37/32 |
| | | | | 251/149.6 |
| 4,465,096 | A * | 8/1984 | Voisine | F16L 37/088 |
| | | | | 137/614.04 |
| 4,625,761 | A * | 12/1986 | Uchida | F16L 29/04 |
| | | | | 251/149.8 |
| 4,815,495 | A * | 3/1989 | Remsburg | F16L 37/23 |
| | | | | 251/126 |
| 5,123,446 | A * | 6/1992 | Haunhorst | F16L 37/23 |
| | | | | 137/614 |
| 6,161,578 | A * | 12/2000 | Braun | F16L 37/35 |
| | | | | 137/614.04 |
| 6,588,452 | B2 * | 7/2003 | Marquart | F16L 37/35 |
| | | | | 137/614 |
| 8,205,914 | B2 * | 6/2012 | Chappaz | F16L 37/32 |
| | | | | 285/276 |
| 8,602,057 | B2 * | 12/2013 | Abura | F16L 37/23 |
| | | | | 251/149.6 |
| 9,080,712 | B2 | 7/2015 | Tiberghien et al. | |
| 9,279,529 | B2 * | 3/2016 | Zhang | F16L 37/148 |
| 9,664,319 | B2 | 5/2017 | Weiland et al. | |
| 10,173,046 | B2 * | 1/2019 | Ciccone | A61M 39/22 |
| 10,427,539 | B2 * | 10/2019 | Dinh | F16L 37/34 |
| 10,865,916 | B2 * | 12/2020 | Tivelli | F16L 29/04 |
| 11,168,824 | B2 * | 11/2021 | Tandberg | F16L 29/04 |
| 11,326,728 | B2 * | 5/2022 | Ma | F16L 37/252 |
| 12,007,050 | B2 * | 6/2024 | Richardson | F16L 29/04 |
| 2002/0047266 | A1 | 4/2002 | Naito | |

FOREIGN PATENT DOCUMENTS

| | | | |
|---|---|---|---|
| DE | 4211255 A1 * | 10/1992 | |
| EP | 2738437 A1 | 6/2014 | |
| EP | 2957810 A1 | 12/2015 | |
| GB | 2202613 A | 9/1988 | |
| IT | TO20110799 A1 | 3/2013 | |
| KR | 20200028683 A * | 3/2020 | |

* cited by examiner

First Fluid Line 46

Valve Coupling Assembly 30

Second Fluid Line 48

Vehicle 44

VALVE FOR A FLUID LINE OF A VEHICLE

INTRODUCTION

The disclosure relates to a valve for a fluid line of a vehicle.

Coupling assemblies are used for connecting fluid lines, particularly in vehicles. When maintenance is required on a cooling system, the coupling assembly is disengaged. This can lead to a significant loss of coolant that flows out of the disengaged fluid lines. Air replaces the lost coolant in the disengaged fluid lines and the coupling assembly. Before re-using after maintenance, the air trapped in the fluid line and the coupling assembly should, in most instances, be removed to avoid malfunctions.

The use of valve coupling assemblies can avoid the loss of coolant and thus the trapping of air. Those coupling assembly of two coupling halves each containing a valve. The valves comprise pistons that are arranged in the fluid channel of the valves. When the valve coupling assembly is separated, e.g. during maintenance, springs push the pistons on the valve seat to close the valve. When the valve coupling assemblies are coupled, e.g. during normal operation, the pistons are pushed away from the valve seats allowing fluid to flow. This flowing through the valve around the pistons and the springs results in turbulences in the fluid flow causing a pressure loss in the valve.

SUMMARY

Thus, a technical object per an embodiment may be providing an improved valve with a reduced pressure loss.

In an embodiment, a valve for a fluid line of a vehicle is provided, the valve comprising a fluid channel, a spring element and support element with a sealing element, wherein the support element is movably arranged in the fluid channel, the fluid channel being configured to guide a fluid between a valve opening and a fluid line connected to the valve, wherein the spring element is configured to push a sealing element via the support element on a valve seat to close the valve, wherein the support element is configured to separate the fluid channel from the spring element.

The support element comprises the sealing element for sealing the valve in a closed state of the valve. The spring element is configured to push the support element with the sealing element on the valve seat to close the valve. The pushing force of the spring element causes sealing element to closely abut on the valve seat if no counter force pushes the support element away from the valve seat. The support element of the valve separates the fluid channel from the spring element such that the spring element is not arranged in the fluid channel. Thus, the spring element does not disturb fluid flowing along the fluid channel, i.e. the formation of turbulences in the flow is reduced. The reduction of the turbulences reduces a pressure loss of the fluid in the valve.

In an example, the at least a portion of the support element may be arranged between the spring element and the fluid channel.

That portion of the support element may shield the fluid channel from the spring element.

In a further example, the support element may comprise a guide element extending around the fluid channel, the guide element being configured to guide fluid along the fluid channel, the spring element extending around the guide element.

Since the spring element extends around the guide element, the guide element is sandwiched between the spring element and the fluid channel. Thus, the fluid flow in the fluid channel does not contact the spring element. The guide element therefore bypasses the fluid flow away from the spring element.

In an example, the fluid channel may extend around the support element, wherein the support element extends around the spring element. The spring element may therefore be arranged inside the support element.

Furthermore, the support element may for example be a valve spool with a spring seat and a sealing seat, wherein the spring element is coupled to the spring seat and the sealing element is attached to the sealing seat.

The spring seat may be arranged on an outside facing portion of the support element, wherein an inward facing portion of the support element may abut to the fluid channel.

In another example, at least one arm may connect the spring seat to the sealing seat, the at least one arm extending through a portion of the fluid channel parallel to a radial direction from a flow direction of the fluid channel.

The at least one arm may further extend from a position close to a central axis of the fluid channel or the valve to a position being radially spaced apart from the central axis. The spring seat may for example be shaped as a cylinder, which extends around the sealing seat. The sealing seat may therefore be arranged on a central position on the support element.

The sealing seat may for example be arranged in the fluid channel.

Furthermore, the sealing seat may comprise an outer wall for guiding a fluid in the fluid channel between the sealing seat and the spring seat.

For example, the valve may then be a torpedo spool valve having a high flow cross sectional area. The guiding of the fluid in the fluid channel further reduces the formation of turbulences. Consequently, the pressure loss is reduced, further.

In another embodiment, a valve coupling assembly comprising a first fluid line connector and a second fluid line connector is provided, wherein the first fluid line connector comprises a valve according to the preceding description.

The effects and further embodiments of the valve coupling assembly according to the present disclosure are analogous to the effects and embodiments of the valve according to the description mentioned above. Thus, it is referred to the above description of the valve.

In a further aspect of the disclosure, a vehicle comprising a first fluid line and a second fluid line is provided, wherein a valve coupling assembly according to the preceding description couples the first fluid line and the second fluid line in a fluid communicative manner.

The effects and further embodiments of the vehicle according to the present disclosure are analogous to the effects and embodiments of the valve and the valve coupling assembly according to the description mentioned above. Thus, it is referred to the above description of the valve and the valve coupling assembly.

BRIEF DESCRIPTION OF THE FIGURES

Further features, details and advantages of the disclosure result from the wording of the claims as well as from the following description of exemplary embodiments based on the drawings. The figures show:

DETAILED DESCRIPTION

Figure 1:
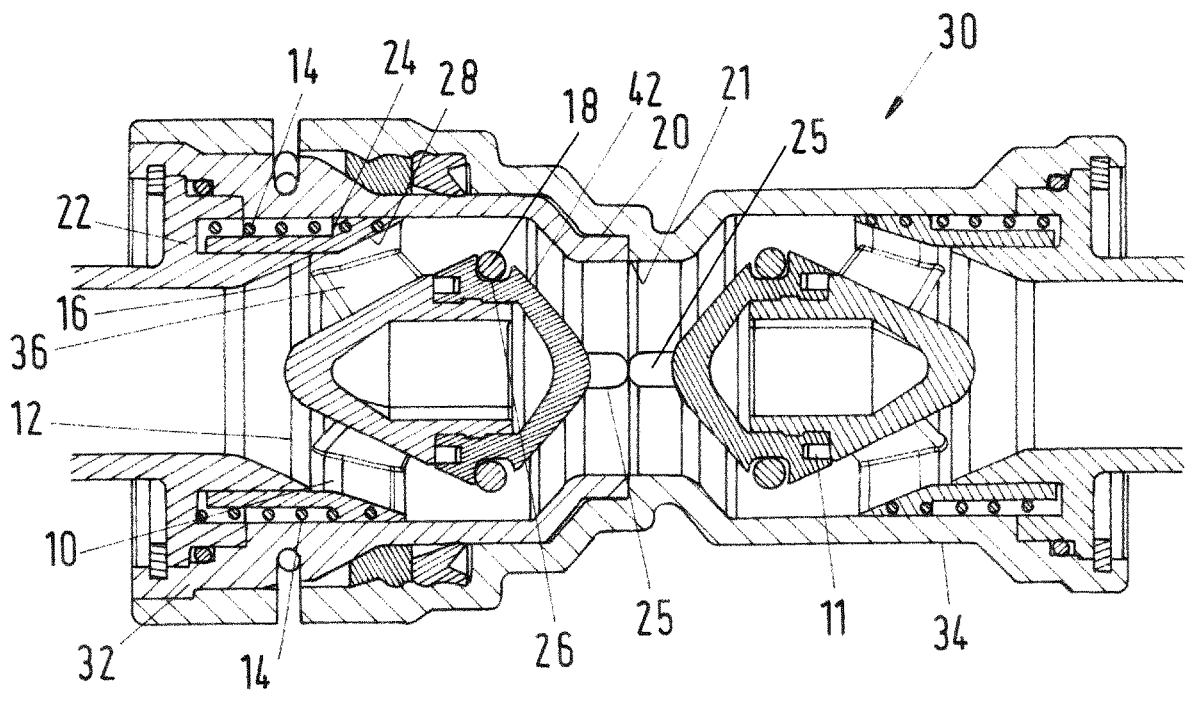
FIG. 1 a schematic drawing of a valve coupling assembly.

FIG. 1 shows a valve coupling assembly, the entirety thereof is denoted with reference sign 30.

The valve coupling assembly 30 comprises a first fluid line connector 32 and a second fluid line connector 34.

The first fluid line connector 32 comprises a valve 10 and is connectable to a first fluid line. Furthermore, the first fluid line connector 32 may be a male spigot.

The valves 10, 11 may have geometrical elements 25 for automatically opening the valves 10, 11 when the first fluid line connector 32 and the second fluid line connector 34 are in an operational state. Then, the valve coupling assembly 30 provides a fluid communicative connection between the coupled fluid lines.

The second fluid line connector 34 is connectable to a second fluid line and may be a female housing being configured to receive the male spigot. The valve coupling assembly 30 may connect the first fluid line to the second fluid line. The second fluid line connector 34 comprises a valve 11 that may have the same features than valve 10. The following description of valve 10 may apply to valve 11, accordingly.

The valve 10 comprises a fluid channel 12, a spring element 14, a support element 16, a sealing element 18 and a valve seat 20.

The fluid channel 12 extends through the valve 10 and provides a fluid communicative connection between the first fluid line that may be connected to the valve 10 and an opening 21 of the valve 10. The valve 10 controls the fluid flow of the first fluid line.

The valve seat 20 is arranged at the opening 21. Furthermore, the valve seat 20 extends around a central axis of the opening 21.

The sealing element 18 is attached to a sealing seat 26 of the support element 16. The support element 16 is movably arranged in the fluid channel 12. The support element 16 may be moved such that the sealing element 18 may be pushed on the valve seat 20 to close the valve 10. When the valve 10 is closed, the support element 16 blocks the opening 21 and the sealing element 18 seals the opening 21.

The support element 16 may further comprise a spring seat 24. The spring seat 24 bears the spring element 14 on the support element 16. The first fluid line connector 32 may comprise a spring bearing for bearing another portion of the spring element 14. The spring element 14 is configured to provide a force that moves the support element 16 towards the opening 21, such that the sealing element 18 is pushed on the valve seat 20.

The spring seat 24 is arranged on an outward facing side of the support element 16, wherein the fluid channel 12 contacts an inward facing side of the support element 16. That inward facing side may act as guide element 28 that guides the fluid along the fluid channel 12.

The support element 16 therefore separates the fluid channel 12 from the spring element 14 such that the spring element 14 is arranged outside the fluid channel 12. A fluid flowing in the fluid channel 12 is undisturbed by the spring element 14.

For separating the fluid channel 12 from the spring element 14, at least a portion 22 of the support element 16 may be arranged between the spring element 14 and the fluid channel 12. The portion 22 provides a physical barrier for the fluid flowing in the fluid channel 12.

Figure 2:
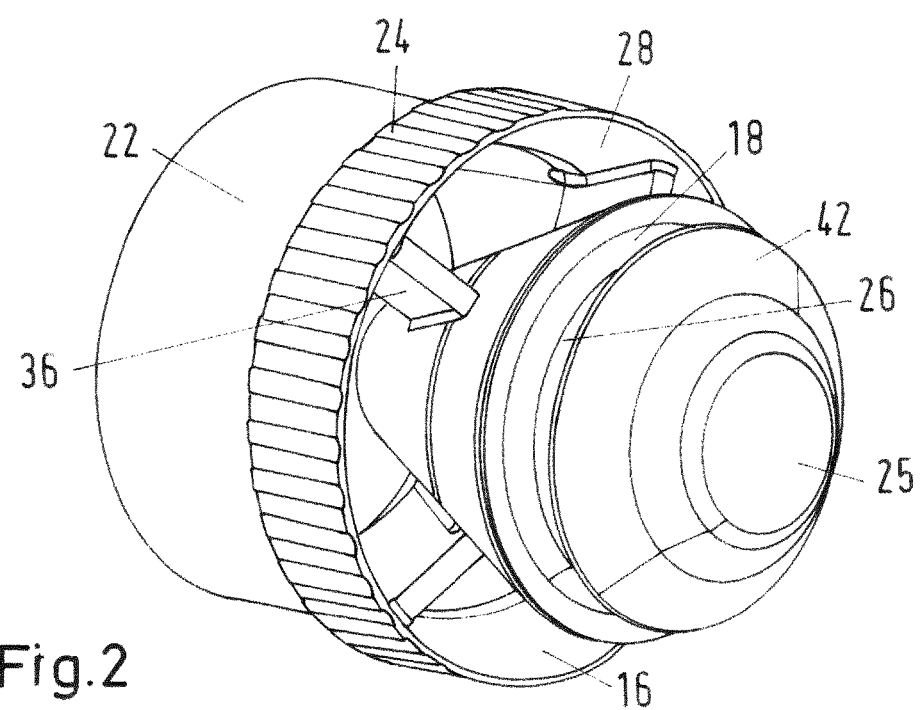
FIG. 2 a schematic drawing of a support element.

The support element 16 may be a valve spool as shown in FIG. 2, particularly a torpedo spool that has the shape of a torpedo.

The spring seat 24 and the sealing seat 26 may be arranged on separate components of the valve spool. On a torpedo spool, the sealing seat 26 may be the body of the torpedo, wherein the spring seat 24 may be the tail of the torpedo.

The sealing seat 26 is arranged in the fluid channel 12. The fluid channel 12 extends around the sealing seat 26. The spring seat 24 may abut to the guide element 28. The spring seat 26 may be arranged on an outward facing side of the portion 22, wherein the guide element 28 may be arranged on an inward facing side of the portion 22, the guide element 28 abutting on the fluid channel 12.

At least one arm 36 may connect the spring seat 24 and the sealing seat 26. The arm 36 extends through the fluid channel 12 along a radial direction from a flow direction of the fluid channel 12. On a torpedo spool, the at least one arm 36 may be the rudder of the torpedo. However, the arm 36 is not movable to change the direction of the fluid flow in the fluid channel 12, actively.

If more than one arm 36 is provided, the arms 36 divide the fluid channel 12 into sub portions. The fluid flow that passes the sub portions of the fluid channel 12 comprises reduced turbulences and eddies. The at least one arm 36 may therefore guide the fluid that flows in the fluid channel 12 to reduce turbulences and eddies.

Figures 3, 4:
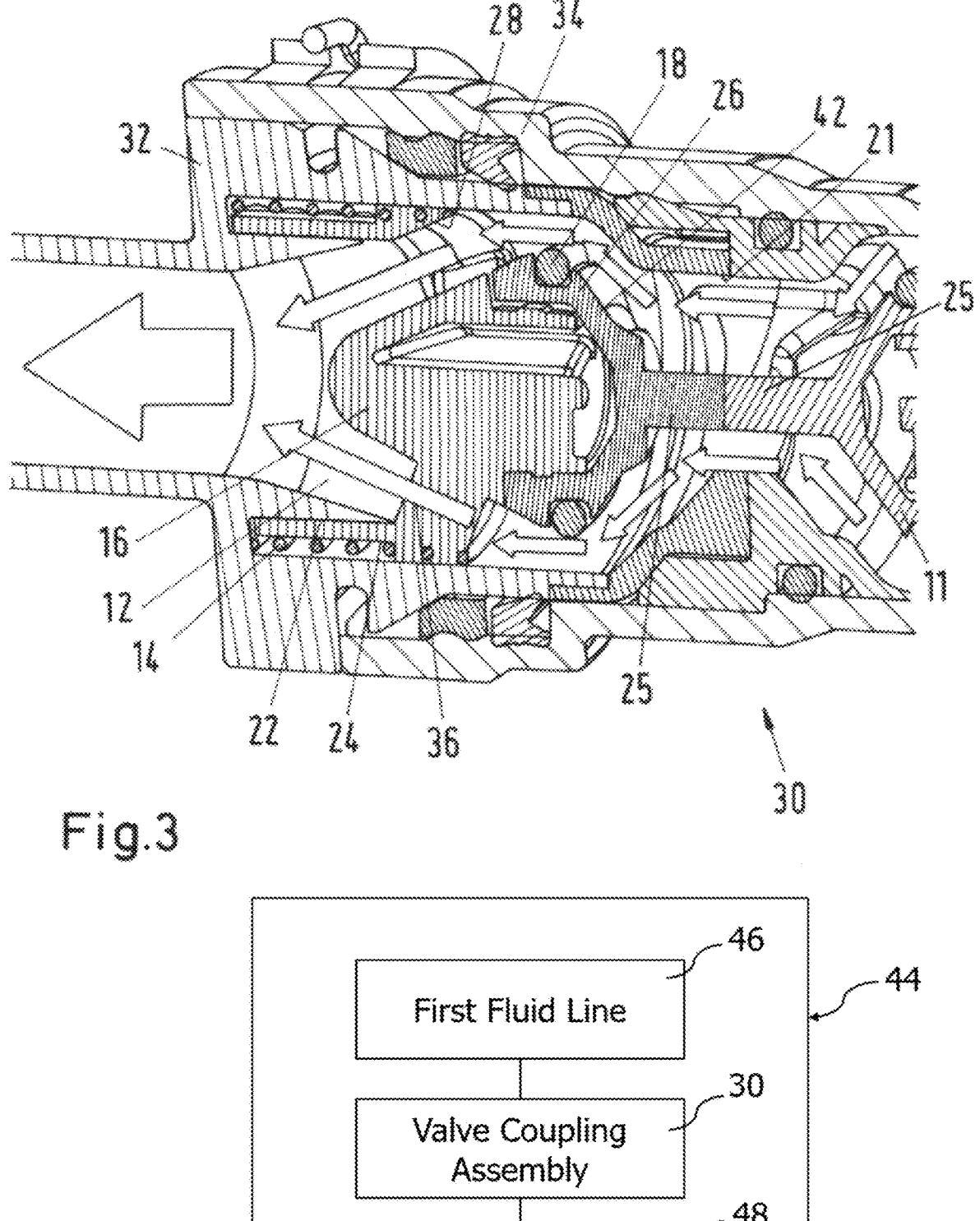
FIG. 3 a schematic drawing of a portion of the valve coupling assembly.
FIG. 4 is a schematic and block diagram view of a vehicle including a valve coupling assembly.

FIG. 3 shows the valve 10 with arrows indicating a direction of the fluid flow through the fluid channel 12. It is evident, that the fluid flow may also be directed in the opposite direction being indicated by the arrows.

The fluid flowing in the fluid channel 12 flows around the sealing seat 26 of the support element 16. An outer wall 42 of the sealing seat 26 guides the fluid around the sealing seat 26. The portion 22 separates the spring element 14 from the fluid channel 12 such that the fluid flow does not contact the spring element 14, when passing the spring seat 24.

FIG. 4 shows a vehicle 44 in block form. The vehicle 44 may comprise the valve coupling assembly 30. The valve coupling assembly 30 may for example connect two fluid lines. The vehicle 44 comprises a first fluid line 46 and a second fluid line 48 wherein the valve coupling assembly 30 couples the first fluid line 46 and the second fluid line 48 in a fluid communicative manner. Those fluid lines may transport a fluid, e.g. coolant. Due to the reduced pressure loss of the valve coupling assembly, vehicle pumps for pumping the fluid through the fluid lines are not required to be increased in size to accommodate for a loss in pressure.

The invention is not limited to one of the aforementioned embodiments. It can be modified in many ways.

All features and advantages resulting from the claims, the description and the drawing, including constructive details, spatial arrangements and procedural steps, may be essential for the invention both in themselves and in various combinations.

As used herein, the terms "general," "generally," and "approximately" are intended to account for the inherent degree of variance and imprecision that is often attributed to, and often accompanies, any design and manufacturing process, including engineering tolerances, and without deviation from the relevant functionality and intended outcome, such that mathematical precision and exactitude is not implied and, in some instances, is not possible.

All the features and advantages, including structural details, spatial arrangements and method steps, which follow from the claims, the description and the drawing can be fundamental to the invention both on their own and in different combinations. It is to be understood that the foregoing is a description of one or more preferred exemplary embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

LIST OF REFERENCE NUMERALS 10 valve
11 valve
12 fluid channel
14 spring element
16 support element
18 sealing element
20 valve seat
21 opening
22 portion of the support element
24 spring seat
25 geometrical element
26 sealing seat
28 guide element
30 valve coupling assembly
32 first fluid line connector
34 second fluid line connector
36 arm
42 outer wall
10 valve
11 valve
12 fluid channel
14 spring element
16 support element
18 sealing element 20 valve seat
21 opening
22 portion of the support element
24 spring seat
25 geometrical element
26 sealing seat
28 guide element
30 valve coupling assembly

The invention claimed is:

1. A valve coupling assembly having a valve for a first fluid line and a second fluid line of a vehicle, the valve comprising a fluid channel, a spring element and support element with a sealing element, wherein the support element is movably arranged in the fluid channel, the fluid channel being configured to guide a fluid between a valve opening and the first fluid line and the second fluid line connected to the valve, wherein the spring element is configured to push the sealing element via the support element on a valve seat to close the valve, wherein the support element is configured to separate the fluid channel from the spring element, wherein the support element is a valve spool with a spring seat and a sealing seat, wherein the spring element is coupled to the spring seat and the sealing element is attached to the sealing seat, wherein the sealing seat comprises an outer wall for guiding the fluid in the fluid channel between the sealing seat and the spring seat, and wherein the sealing seat has a reduced non-solid cross-section and is configured as a hollow cross-section, wherein at least one arm connects the spring seat to the sealing seat, the at least one arm extending through a portion of the fluid channel parallel to a radial direction from a flow direction of the fluid channel.

2. The valve coupling assembly according to claim 1, wherein at least a portion of the support element is arranged between the spring element and the fluid channel.

3. The valve coupling assembly according to claim 1, wherein the support element comprises a guide element extending around the fluid channel, the guide element being configured to guide fluid along the fluid channel, the spring element extending around the guide element.

4. The valve coupling assembly according to claim 1, wherein the sealing seat is arranged in the fluid channel.

5. The valve coupling assembly of claim 1 further comprising a first fluid line connector and a second fluid line connector, wherein at least the first fluid line connector comprises the valve.

6. The vehicle comprising the first fluid line and the second fluid line, wherein the valve coupling assembly according to claim 5 couples the first fluid line and the second fluid line in a fluid communicative manner.

7. The valve coupling assembly of claim 1 wherein the at least one arm may be a rudder.

8. The valve coupling assembly of claim 1 wherein the at least one arm comprises a plurality of arms to divide the fluid channel into sub-portions.

* * * * *